United States Patent
Lin et al.

(10) Patent No.: US 9,392,674 B2
(45) Date of Patent: Jul. 12, 2016

(54) ENVIRONMENT DETECTION DEVICE AND ENVIRONMENT DETECTION METHOD SUITABLE FOR STREET LAMP

(71) Applicant: LITE-ON TECHNOLOGY CORPORATION, Taipei (TW)

(72) Inventors: Ching-Hsien Lin, Taipei (TW); Ming-Hung Huang, Taipei (TW); Chia-Ming Hung, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 14/523,077

(22) Filed: Oct. 24, 2014

(65) Prior Publication Data
US 2015/0173159 A1 Jun. 18, 2015

(30) Foreign Application Priority Data
Dec. 13, 2013 (TW) .............................. 102146260 A (51) Int. Cl.
*H05B 37/02* (2006.01)
*H05B 37/03* (2006.01)
*G01W 1/00* (2006.01)

(52) U.S. Cl.
CPC ............ *H05B 37/0227* (2013.01); *G01W 1/00* (2013.01); *H05B 37/0218* (2013.01); *H05B 37/0272* (2013.01); *H05B 37/0281* (2013.01); *H05B 37/03* (2013.01)

(58) Field of Classification Search
CPC ..... G01W 1/00; H05B 37/02; H05B 37/0218; H05B 37/0227; H05B 37/0272; H05B 37/0281; H05B 37/03
USPC .................................. 315/291, 307, 120, 308
See application file for complete search history.

(56) References Cited

U.S. PATENT DOCUMENTS

| | | | |
|---|---|---|---|
| 7,817,063 B2 * | 10/2010 | Hawkins | G06Q 20/127 340/870.07 |
| 2009/0066258 A1 * | 3/2009 | Cleland | H02J 3/14 315/158 |
| 2012/0062123 A1 | 3/2012 | Jarrell et al. | |
| 2013/0162820 A1 | 6/2013 | Chiang et al. | |
| 2013/0181636 A1 | 7/2013 | Agrawal | |
| 2013/0234862 A1 | 9/2013 | Toth et al. | |

FOREIGN PATENT DOCUMENTS

| | | |
|---|---|---|
| CN | 202634836 U | 12/2012 |
| TW | M360413 U | 7/2009 |
| TW | M391667 U | 11/2010 |
| TW | 201200785 A | 1/2012 |
| TW | 201337312 A | 9/2013 |
| WO | 2007/044445 A2 | 4/2007 |

OTHER PUBLICATIONS

European Search Report corresponding to EP No. 14194984.2, Apr. 17, 2015, 5 pages.

* cited by examiner

*Primary Examiner* — Jimmy Vu
(74) *Attorney, Agent, or Firm* — Innovation Counsel LLP (57) ABSTRACT

An environment detection device and an environment detection method suitable for a street lamp are provided. The environment detection method comprises the following steps. Latitude and longitude of the position of the street lamp is provided. A weather information at the position of the street lamp is detected. A first network packet is generated according to the weather information and the latitude and longitude. The first network packet is transmitted to a server.

25 Claims, 11 Drawing Sheets

ENVIRONMENT DETECTION DEVICE AND ENVIRONMENT DETECTION METHOD SUITABLE FOR STREET LAMP

This application claims the benefit of Taiwan application Serial No. 102146260, filed Dec. 13, 2013, the subject matter of which is incorporated herein by reference.

BACKGROUND OF THE INVENTION

1. Field of the Invention

The invention relates in general to an environment detection device and an environment detection method suitable for a street lamp.

2. Description of the Related Art

Street lamp is an important part of road Infrastructure and is also a traffic facility indispensable to assure pedestrians' safety. The installation of street lamps is featured by large area and huge demand. However, currently most street lamps or outdoor street lamps adopt offline architecture which does not have a system for reporting back. When a street lamp is in a faulted state, the fault is normally noticed and reported by pedestrians and cannot be reported in a real-time manner to fix the fault in time. Since most street lamps or outdoor street lamps are connected by physical wires, it is very difficult to dynamically re-wire to add an additional system, for example, a system for reporting back. Therefore, how to apply the features of street lamps and add an additional device to an existing system of street lamps to benefit people's everyday life and resolve the defects of the street lamps adopting offline architecture has become a prominent task for the industries.

SUMMARY OF THE INVENTION

The invention is directed to an environment detection device and an environment detection method suitable for a street lamp. Latitude and longitude and weather information at a street lamp are detected by an environment detection device, and the detected information is transmitted to a remote end by a wireless network module, not only resolving the defects of the street lamp adopting an offline architecture, but also adding more functions to the street lamp.

According to one embodiment of the present invention, an environment detection method suitable for a street lamp is provided. The environment detection method comprises the following steps. Latitude and longitude of the position of the street lamp is provided. A weather information at the position of the street lamp is detected. A first network packet is generated according to the weather information and the latitude and longitude. The first network packet is transmitted to a server.

According to one embodiment of the present invention, an environment detection device is provided. The environment detection device is coupled to an illumination device of a street lamp through a connection base for managing the illumination device of the street lamp. The environment detection device comprises a positioning module, a weather information detection module, a processing unit and a wireless network module. The positioning module is for positioning the latitude and longitude of the position of the environment detection device. The weather information detection module is for detecting the weather information at the latitude and longitude. The processing unit is coupled to the positioning module and the weather information detection module. The processing unit is for generating a first network packet according to the weather information and the latitude and longitude. The wireless network module is coupled to the processing unit for transmitting the first network packet to a server.

The above and other aspects of the invention will become better understood with regard to the following detailed description of the preferred but non-limiting embodiment (s). The following description is made with reference to the accompanying drawings.

DETAILED DESCRIPTION OF THE INVENTION

First Embodiment

Figure 1:
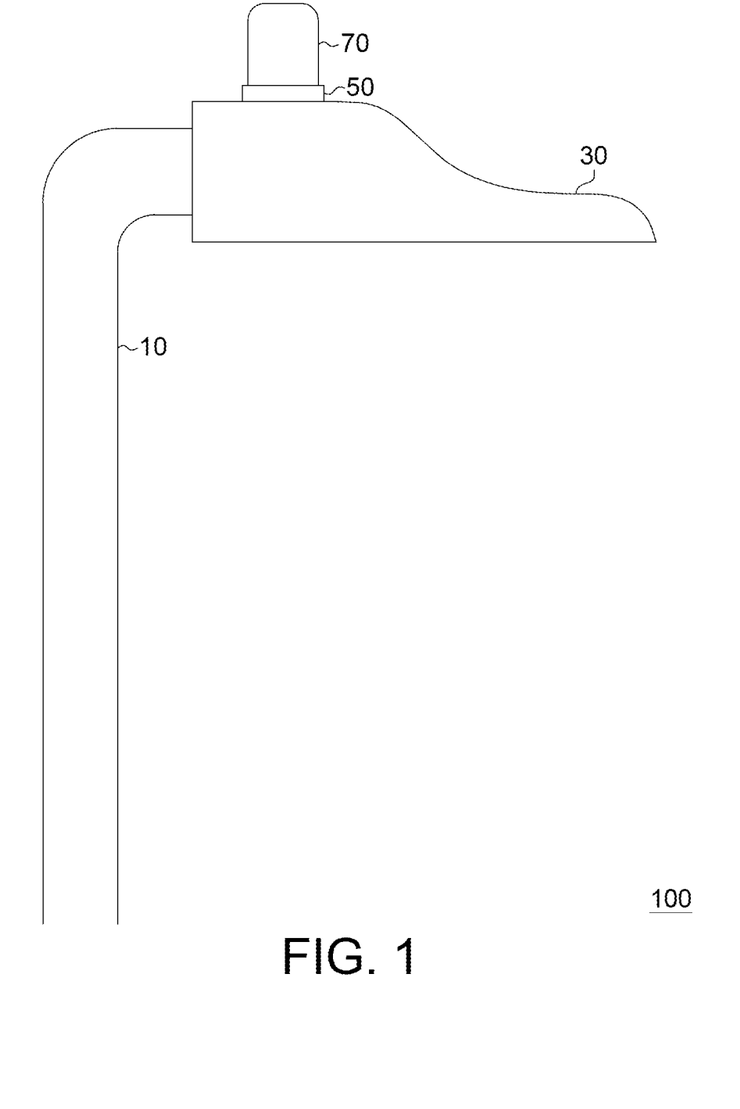
FIG. 1 shows a schematic diagram of a street lamp 100 according to a first embodiment.
Figure 2:
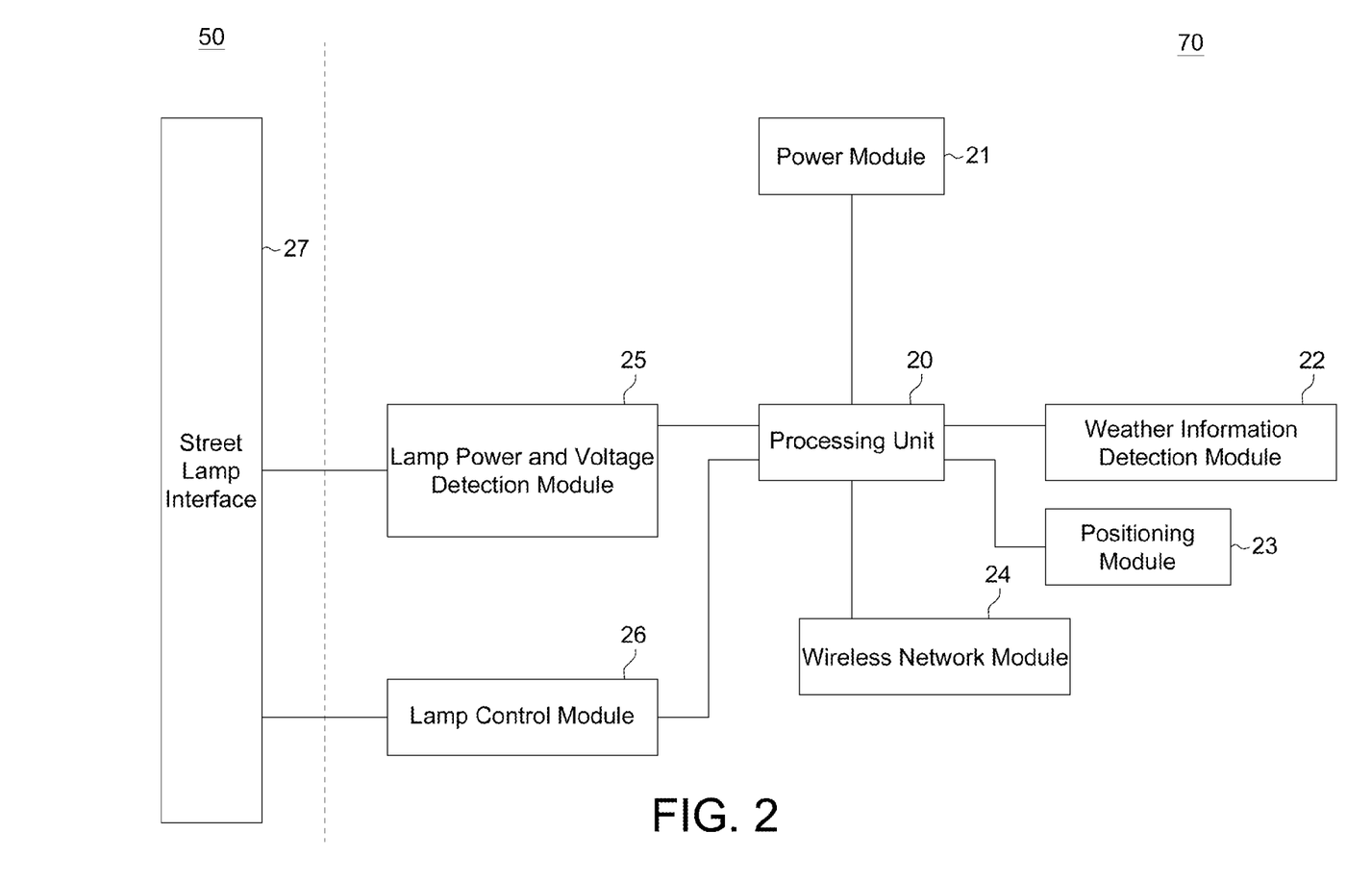
FIG. 2 shows a block diagram of an environment detection device 70 and a connection base 50 according to a first embodiment.

Referring to FIG. 1 and FIG. 2, FIG. 1 shows a schematic diagram of a street lamp 100 according to a first embodiment, and FIG. 2 shows a block diagram of an environment detection device 70 and a connection base 50 according to a first embodiment. The street lamp 100 comprises a lighting pole 10, an illumination device 30, a connection base 50, and an environment detection device 70. The illumination device 30 has a lighting element, for example, a fluorescent lamp or a light emitting diode (LED). The environment detection device 70 is coupled to the illumination device 30 through the connection base 50 for detecting the information of the surrounding environment used for managing the properties of the illumination device 30 of the street lamp 100. For example, the environment detection device 70 controls the on/off status of the illumination device 30 and/or adjusts the brightness of the illumination device 30. The connection base 50 comprises a street lamp interface 27 coupled to the illumination device 30 of the street lamp 100. The street lamp interface 27 is an interface complying with standards, for example an interface complying with product category rules (PCR), ANSI 136.10 or NEMA standards.

In the present embodiment, the environment detection device 70 comprises a processing unit 20, a power module 21, a weather information detection module 22, a positioning module 23, a wireless network module 24, a lamp power and voltage detection module 25, and a lamp control module 26. The processing unit 20 is for performing various operational procedures and control procedures, and can be implemented by, for example, a micro-processing chip, a firmware circuit or a storage medium storing a plurality of programming codes. The power module 21 is coupled to the processing unit 20 for supplying power to the environment detection device 70. The power module 21 is implemented by, for example, a power supply. In another embodiment, the power module 21 can be coupled to the street lamp interface 27. The street lamp interface 27 receives an external power and further provides the received power to the environment detection device 70. In other words, the power module 21 of the environment detection device 70 can provide the required power and/or receive the required power from an external source. For example, the power provided to the illumination device 30 can also be provided to the environment detection device 70 through the street lamp interface 27. The weather detection module 22 is for detecting the weather information, and comprises, for example, an hourly rainfall sensor, a brightness detector, a wind velocity detector, a temperature moisture detector, a UV light detector. The positioning module 23 is for positioning the position and transmitting a position signal, and comprises, for example, a global positioning system (GPS) transmitter-receiver module and an antenna module. The wireless network module 24 is for transmitting and receiving a wireless network packet, and comprises, for example, a wireless network transmission module and antenna module. The lamp power and voltage detection module 25 is coupled to the processing unit 20 and the street lamp interface 27 of the connection base 50, and is for detecting the output power and voltage of the illumination device 30 of the street lamp 100. The lamp power and voltage detection module 25 can be implemented by, for example, a power measurement device and a voltage measurement device. The lamp control module 26 is coupled to the processing unit 20 and the street lamp interface 27 of the connection base 50 for transmitting a control signal to the connection base 50 to control the illumination device 30 of the street lamp 100. The lamp control module 26 can be implemented by, for example, a controller.

Figure 3:
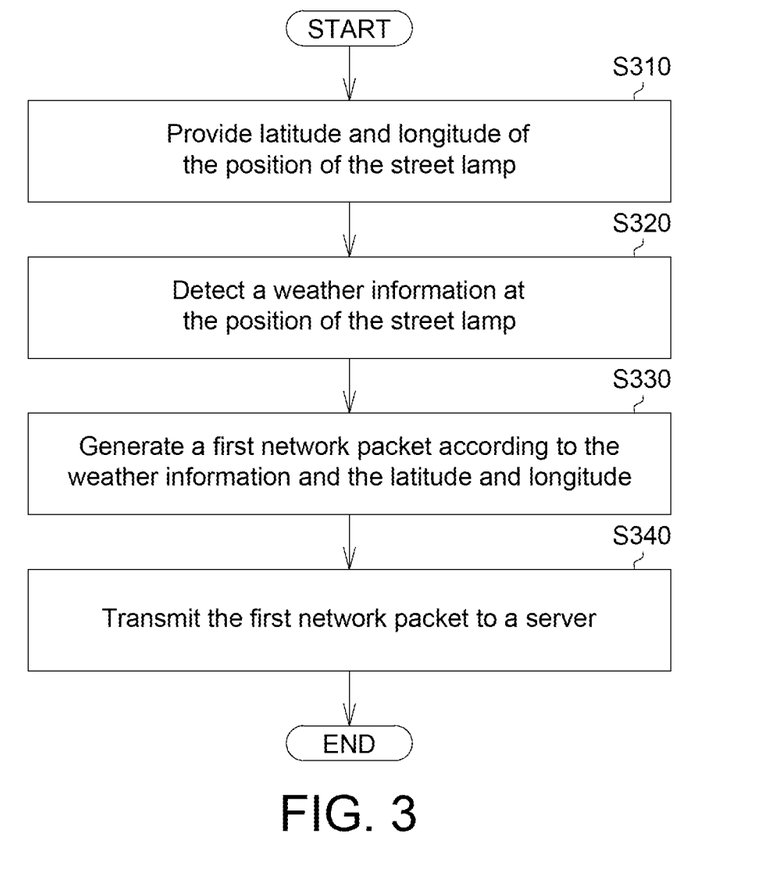
FIG. 3 shows a flowchart of an environment detection method according to a first embodiment.

Referring to FIG. 3, a flowchart of an environment detection method according to a first embodiment is shown. The operations of various components disclosed above and procedures of the environment detection method of the present embodiment are elaborated below with an accompanying flowchart of the environment detection method. However, anyone who is skilled in the technology field of the invention will understand that, the method for reading control signals disclosed in the present embodiment is not limited to the use in the environment detection device 70 and the connection base 50 of FIG. 2, and the procedures and sequence of the flowchart are for description purpose only, not for limiting the invention.

Firstly, in step S310, latitude and longitude of the position of the street lamp 100 is provided by the positioning module 23. For example, the positioning module 23 can position the latitude and longitude of the position of the street lamp 100. Then, the method proceeds to step S320, the weather information at the position of the street lamp 100 is detected by the weather information detection module 22. For example, the weather information detection module 22 detects the weather information at the position of the street lamp 100, wherein the weather information is, for example, current sunlight brightness, current wind velocity, current degree of exposure to the UV light, current temperature or current moisture, and so on.

Following step S320, based on actual design needs, the processing unit 20 can be used to determine whether the illumination device 30 needs to be activated or shut down according to the latitude and longitude and the weather information. For example, if it is at dusk and near sunset and the sunlight brightness detected by the weather information detection module 22 is less than a sunlight brightness threshold, the processing unit 20 determines that the illumination device 30 needs to be activated. Then, the processing unit 20 controls the lamp control module 26 to output a control signal of turning on power to the connection base 50 to activate the illumination device 30.

Then, after activating the illumination device 30, the processing unit 20 determines whether the illumination device 30 is abnormal. If the illumination device 30 is abnormal, the processing unit 20 reports a failure message to the server and enables the illumination device 30 to enter a failure mode. The failure message at least comprises the latitude and longitude of the street lamp. Conversely, if the illumination device 30 is not abnormal, the processing unit 20 directly generates a network packet according to the weather information and the latitude and longitude. Once the street lamp becomes abnormal, the processing unit 20 can immediately report the failure message to the host at a control center, such that maintenance staff can immediately identify which street lamp is faulted according to the latitude and longitude of the position of the street lamp. It can solve the problem that conventionally the maintenance staff can only have a rough idea about the position of the faulted street lamp.

On the other hand, if it is at the dawn and near the sunrise and the sunlight brightness detected by the weather information detection module 22 is greater than or equal to a threshold of sunlight brightness, the processing unit 20 determines that the illumination device 30 needs to be shut down, and the processing unit 20 controls the lamp control module 26 to output a control signal of turning off power to the connection base 50 to shut down the illumination device 30. Besides, the illumination device 30 is not limited to perform the said determination step according to the sunlight brightness. The illumination device 30 can also perform the determination step according to the wind velocity, the temperature, the moisture, or the UV light etc. detected by the weather information detection module 22. Thus, under current environment circumstances, the illumination device 30 can automatically determine whether the illumination device 30 needs to be activated or shut down and determine whether the brightness needs to be adjusted according to the weather information detected by the weather information detection module 22. Besides, the wireless network module 24 can transmit the weather information to the server, and the server accordingly activates or shuts down the illumination device 30.

Then, the method proceeds to step S330, a network packet is generated by the processing unit 20 according to the weather information and the latitude and longitude. For example, the processing unit 20 generates the network packet according to the sunlight brightness and the latitude and longitude of the position of the street lamp 100 detected by the weather information detection module 22. In step S340, the network packet is transmitted to a server by the wireless network module 24. Through the above steps, as long as mobile network is available, the wireless network module 24 can transmit the network packet through the mobile network. Since the coverage rate of the mobile network is so high, the cables do not need to be rerouted. The connection base 50 can be detachably installed on the street lamp which needs to report the environment information, and the environment detection device 70 can further be disposed on the connection base 50 for detecting meteorological data, such that the illumination device 30 can be controlled in a real-time manner. Conventionally, the control of street lamps is based on a regional basis. That is, the street lamps are divided into several regions. Through the above design of transmitting the network packet by the wireless network module 24, the control of the on/off state and brightness of a particular street lamp alone can be achieved.

Following step S340, according to actual design needs, the processing unit 20 can be used to determine whether the current time has reached a pre-determined time. For example, if the processing unit 20 is set to transmit a network packet to a server at a pre-determined time 5:00 and if the current time is 5:00, the processing unit 20 controls the wireless network module 24 to transmit the network packet to the server. Then, the processing unit 20 further determines whether the wireless network module 24 has received a control command from the server. If the wireless network module 24 has received the control command from the server, the processing unit 20 executes the control command 20. Conversely, if the wireless network module 24 has not yet received the control command from the server, the weather information detection module 22 again enters step S320 to detect the weather information at the position of the environment detection device 70.

Conversely, if the processing unit 20 is set to transmit a network packet to the server at a pre-determined time 5:00 and the current time is 4:50, the processing unit 20 does not transmit the network packet to the serve but determines whether the wireless network module 24 has received the control command from the server. If the wireless network module 24 has received the control command from the server, the processing unit 20 executes the control command. Conversely, if the wireless network module 24 has not yet received the control command from the server, the weather information detection module 22 again detects the weather information at the position of the environment detection device 70. The control command which activates control or adjustment is determined by the server end. For example, when the server end determines that sandstorm is attacking based on the received weather information, the server end transmits a control command to the wireless network module 24 for activating the illumination device 30 or increasing its brightness such that pedestrians' safety can be assured. Since the processing unit 20 transmits network packets only at the predetermined time set by the user, the transmission of network packets will not be too frequent and not consume too much power.

Figure 4:
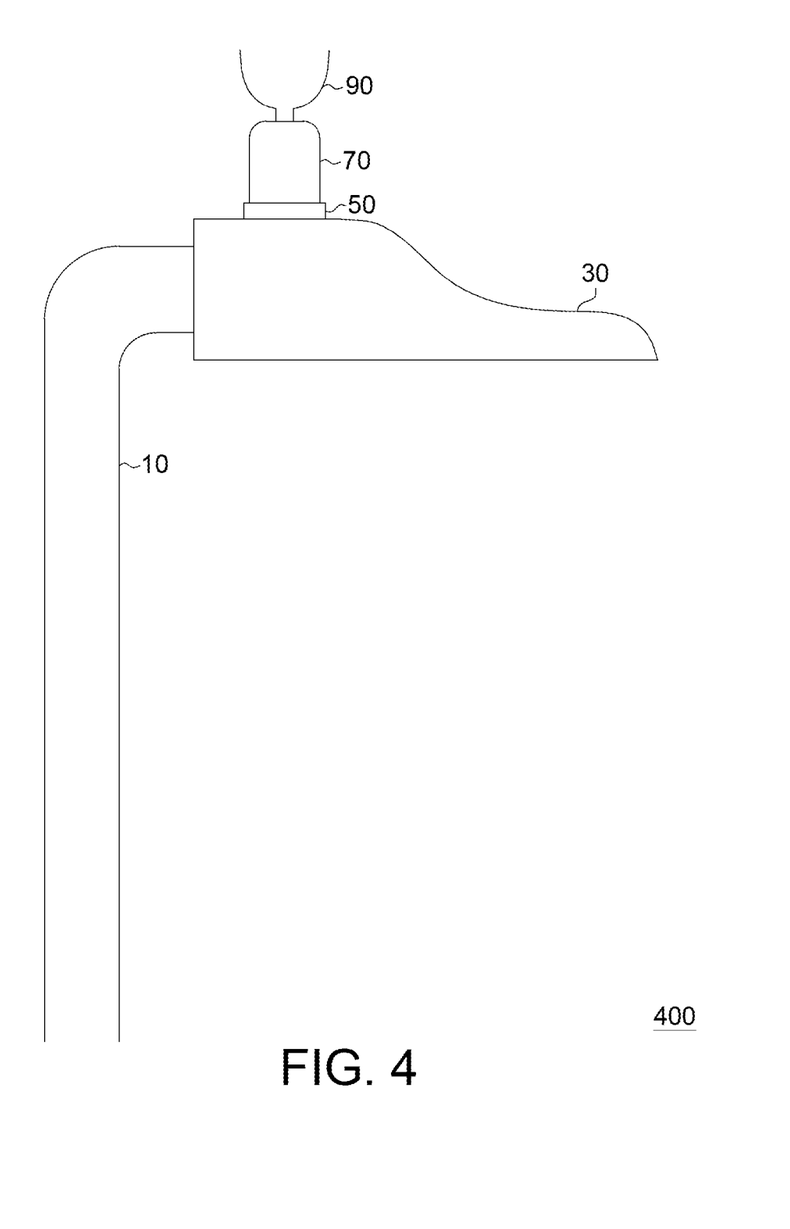
FIG. 4 shows a schematic diagram of a street lamp 400 according to a second embodiment.

Referring to FIG. 4, a schematic diagram of a street lamp 400 according to a second embodiment is shown. The street lamp 400 of FIG. 4 is different from the street lamp 100 of FIG. 1 in that the street lamp 400 of FIG. 4 further comprises an hourly rainfall sensor 90. When it rains, the rainfall flows to the environment detection device 70 through the hourly rainfall sensor 90 and is discharged from the environment detection device 70. Meanwhile, the rainfall sensor converts the flow of the received rainfall into a voltage to obtain a rainfall voltage value relevant to the rainfall, and further transmits the rainfall voltage value and the latitude and longitude of the position of the street lamp to the server. The user at the server end can estimate the rainfall at the latitude and longitude of the position of the street lamp according to the rainfall voltage value. Therefore, apart from providing lighting function, the street lamp 400 is just like a small meteorological station.

Third Embodiment

Figure 5:
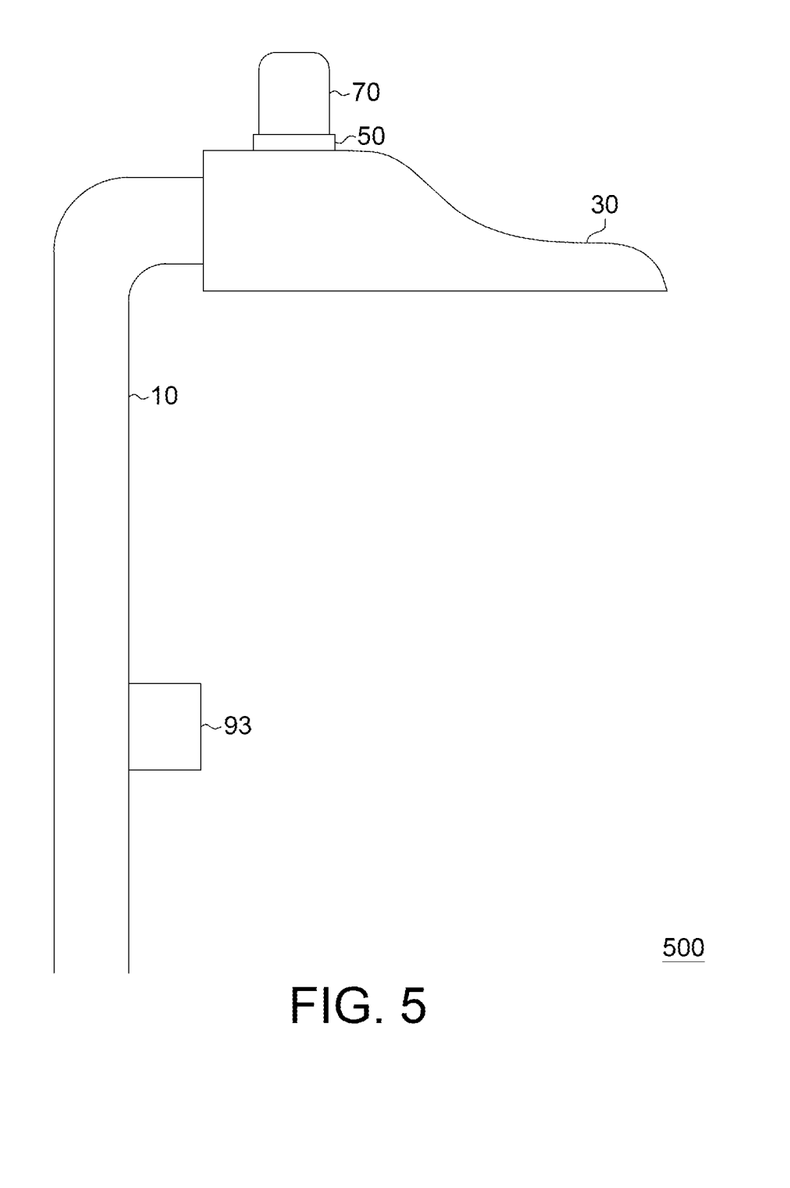
FIG. 5 shows a schematic diagram of a street lamp 500 according to a third embodiment.
Figure 6:
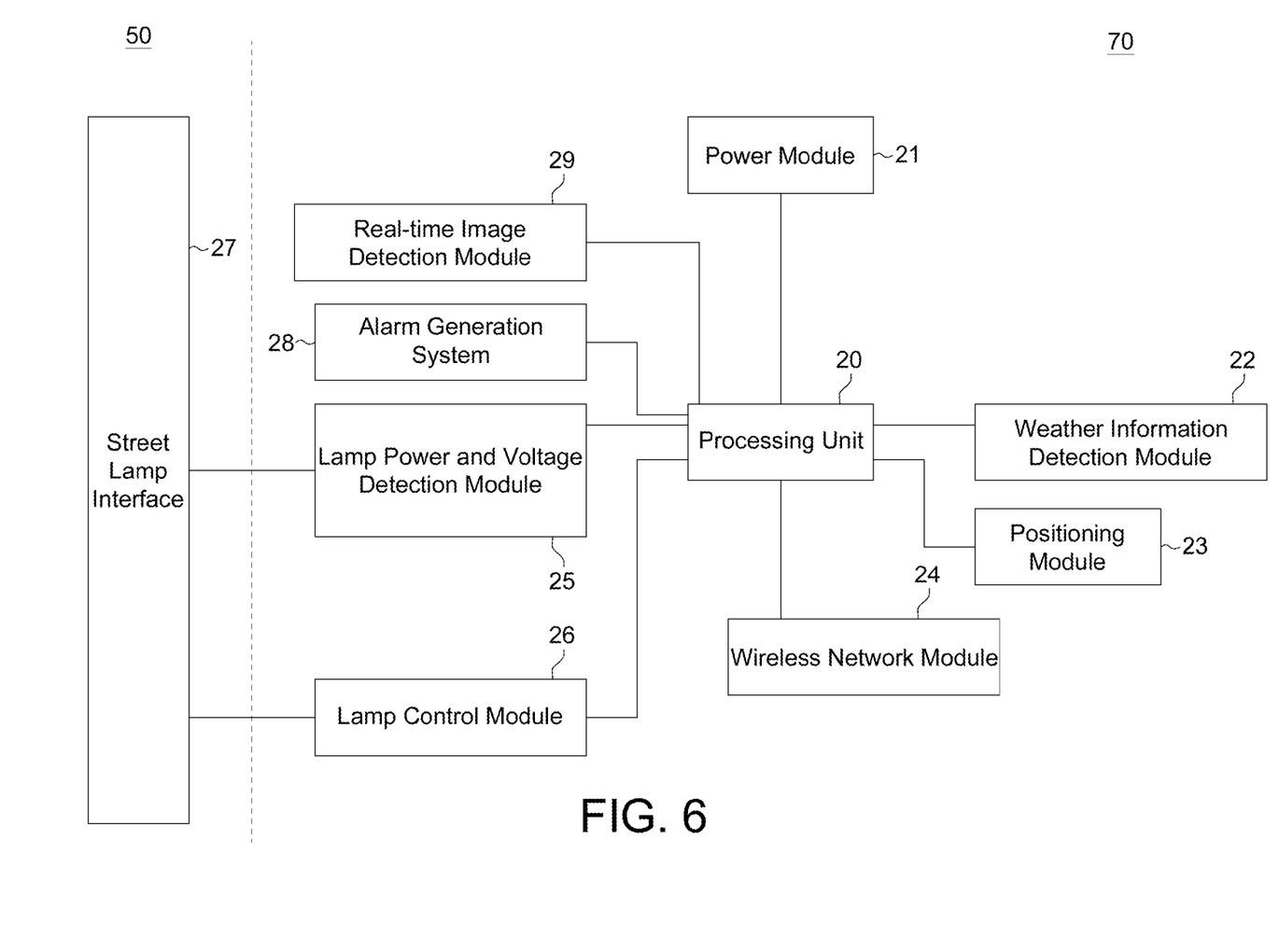
FIG. 6 shows a block diagram of an environment detection device 70 and a connection base 50 according to a third embodiment.

Referring to FIG. 5 and FIG. 6 at the same time, FIG. 5 shows a schematic diagram of a street lamp 500 according to a third embodiment, and FIG. 6 shows a block diagram of an environment detection device 70 and a connection base 50 according to a third embodiment. The street lamp 500 of the present embodiment is different from the street lamp 100 of the first embodiment mainly in that the street lamp 500 of the present embodiment further comprises an alarm device 93, and the environment detection device 70 of the present embodiment further comprises an alarm generation system 28 and a real-time image detection module 29. The alarm device 93 is disposed on the lighting pole 10 of the street lamp 100. After the alarm device 93 is triggered off, the alarm device 93 emits an alarm signal to the processing unit 20, and the processing unit 20 emits a warning light or a warning tone through the alarm generation system 28. Besides, the alarm generation system 28 comprises a warning light source module and a warning tone module. The warning light source module can be implemented by, for example, an LED, and the warning tone module can be implemented by, for example, an audio broadcasting device. Moreover, the processing unit 20 can further control an image capturing device disposed on the street lamp 500 through the real-time image detection module 29 and rotate the camera lens of the image capturing device to a position from which the image capturing device can capture the image frame under the street lamp 500. Then, the processing unit 20 generates a network packet according to the alarm signal and the latitude and longitude of the position of the street lamp 500, and further transmits the network packet to a server.

Thus, when pedestrians experience an emergency under the street lamp 500, for example, one of the pedestrians suddenly had a blackout, the awaken one can immediately press the alarm device 93 for enabling the alarm generation system 28 to emit a warning light or a warning tone to attract other people's attention so that they can help with the emergency. Furthermore, the remote-end server receives the alarm signal and obtains the position of the emergency according to the latitude and longitude of the position of the street lamp 500, and the operator at the server end can immediately send an ambulance to the street lamp 500 to help with the emergency. In addition, the image detection module 29 can also transmit the image frame under the street lamp 500 to the server, such that people at the server end can monitor the emergency site in a real-time manner. The present embodiment harnesses the wide distribution of street lamps and further incorporates the street lamps in various aspects of social security.

Fourth Embodiment

Figure 7:
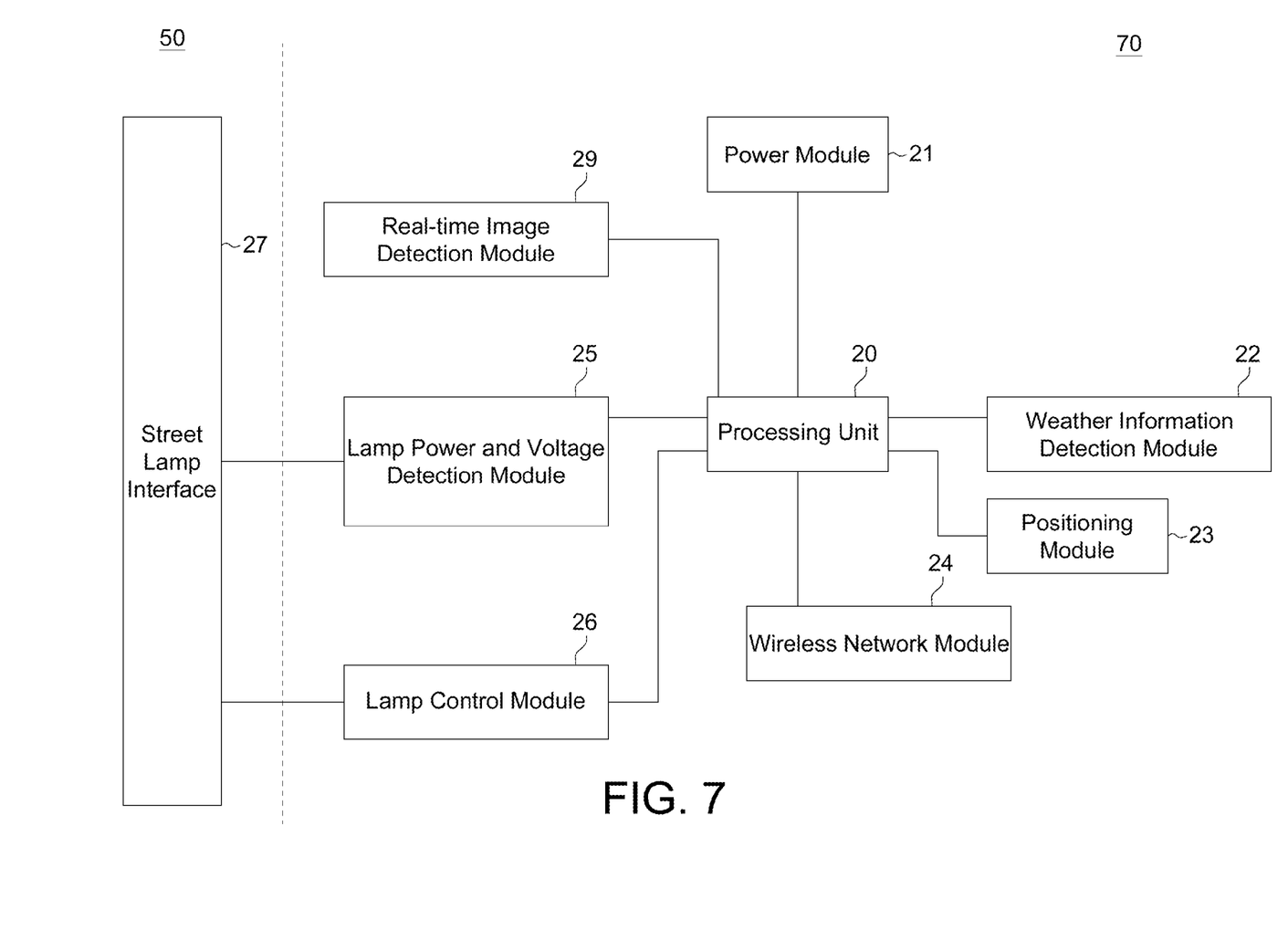
FIG. 7 shows a block diagram of an environment detection device 70 and a connection base 50 according to a fourth embodiment.
Figure 8:
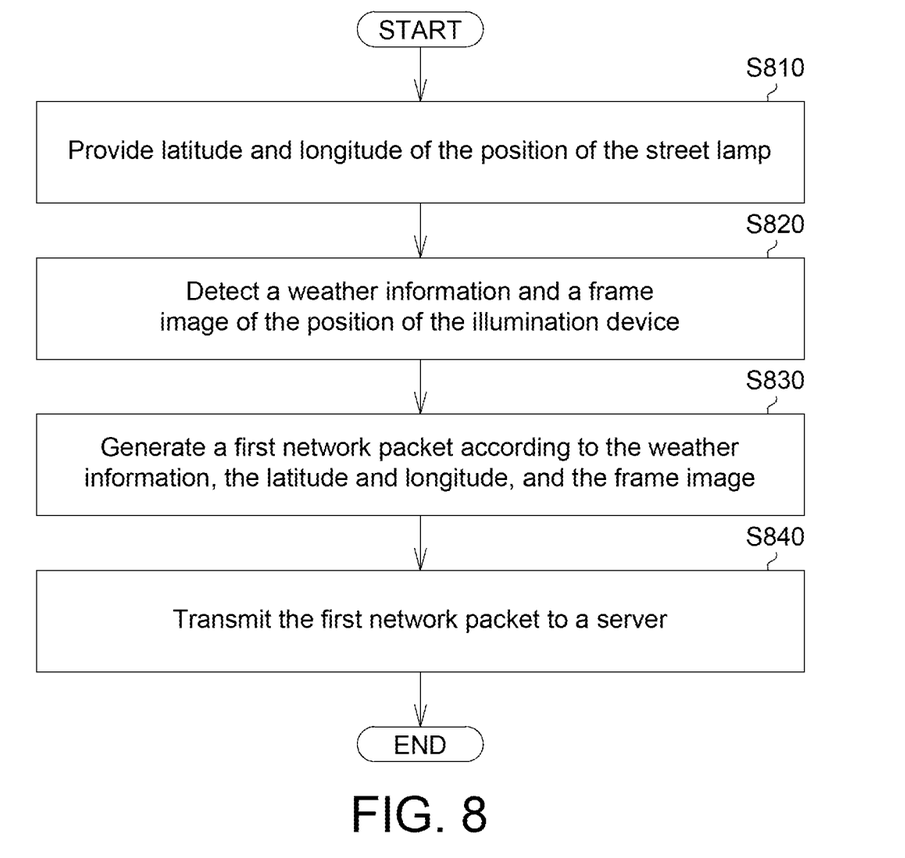
FIG. 8 shows a flowchart of an environment detection method according to a fourth embodiment.

Referring to FIG. 7 and FIG. 8 at the same time, FIG. 7 shows a block diagram of an environment detection device 70 and a connection base 50 according to a fourth embodiment, and FIG. 8 shows a flowchart of an environment detection method according to the fourth embodiment. The present embodiment is different from the environment detection device 70 of the first embodiment mainly in that the environment detection device 70 of the present embodiment further comprises a real-time image detection module 29 coupled to the processing unit 20. The environment detection method of the present embodiment is different from that of the first embodiment mainly in that steps S820 and S830 of the present embodiment replace steps S320 and S330 of the first embodiment, an image frame is detected, and a network packet is generated according to the weather information, the latitude and longitude and the image frame. Steps S810 and S840 of the present embodiment are identical to steps S310 and S340 of the first embodiment, and the similarities are not repeated here. Thus, the server end can receive the weather information, the latitude and longitude and the image frame detected by the image sensor. Therefore, apart from providing the latitude and longitude and detecting the weather information, the street lamp can provide the same function of a monitor.

Fifth Embodiment

Figure 9:
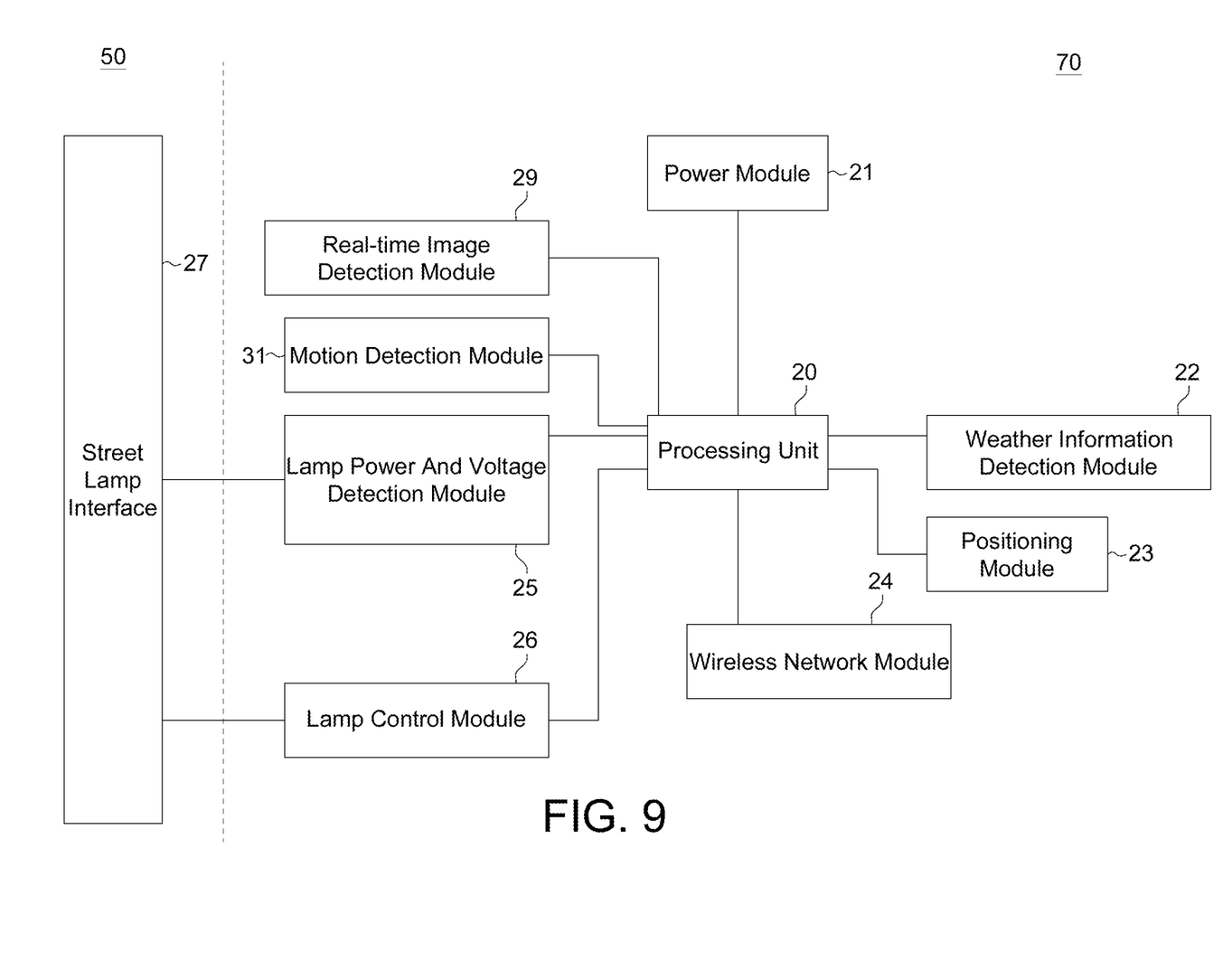
FIG. 9 shows a block diagram of an environment detection device 70 and a connection base 50 according to a fifth embodiment.

Referring to FIG. 9, a block diagram of an environment detection device 70 and a connection base 50 according to a fifth embodiment is shown. The environment detection device 70 of the present embodiment is different from the environment detection device 70 of the fourth embodiment mainly in that the environment detection device 70 of the present embodiment further comprises a motion detection module 31 coupled to the processing unit 20 for detecting at least one moving object in the image frame. Then, the processing unit 20 determines whether the quantity of the at least one moving object in the image frame is greater than a quantity threshold of moving objects, and generates a determination result. The processing unit 20 can determine whether to adjust the illumination device 30 according to the determination result. For example, if the quantity of the at least one moving object in the image frame is greater than the quantity threshold of moving objects, the processing unit 20 adjusts the brightness of the illumination device 30. If the quantity of the at least one moving object in the image frame is not greater than the quantity threshold of moving objects, the brightness of the illumination device 30 is not adjusted and current brightness is maintained. Besides, other parts of the present embodiment are identical to that of the third embodiment, and the similarities are not repeated here.

For example, when sandstorm attacks, even in the daytime, the environment brightness detected by the weather detection module 22 is still lower, and there are fewer pedestrians. Meanwhile, if the motion detection module 31 determines that the quantity of moving objects in the image frame is greater than the quantity threshold of moving objects, the processing unit 20 can increase the brightness of the illumination device 30. The moving objects can refer to pedestrians or vehicles. According to the design of the present embodiment, the illumination device 30 provides suitable brightness to assure pedestrians' safety, and it is not necessary to increase the brightness level to save power consumption when there are no pedestrians or vehicles passing by the street lamps.

Sixth Embodiment

Figure 10:
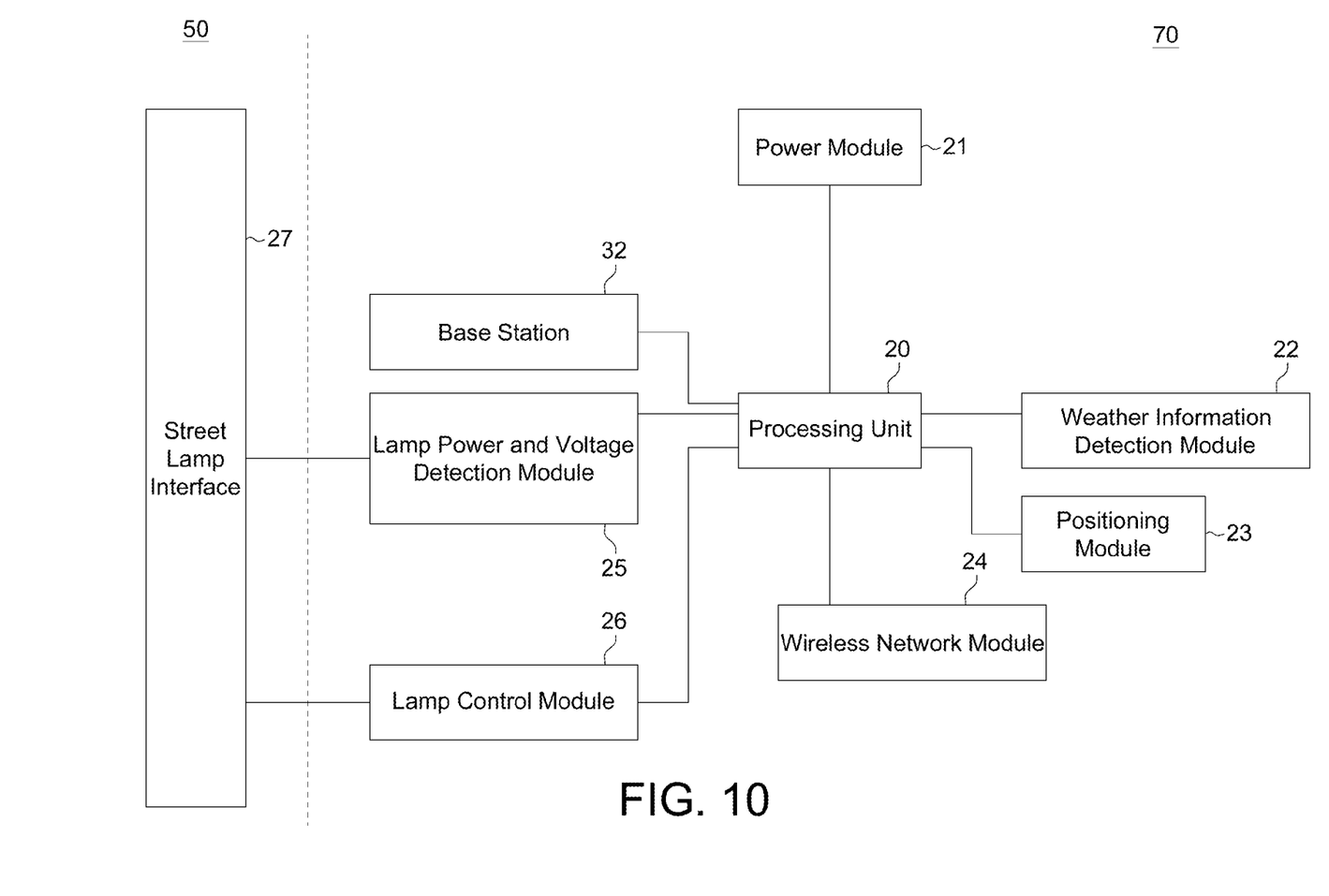
FIG. 10 shows a block diagram of an environment detection device 70 and a connection base 50 according to a sixth embodiment

Referring to FIG. 10, a block diagram of an environment detection device 70 and a connection base 50 according to a sixth embodiment is shown. The environment detection device 70 of the present embodiment is different from the environment detection device 70 of the first embodiment mainly in that the environment detection device 70 of the present embodiment further comprises a base station 32 for transmitting and/or receiving a signal. When the server determines that all street lamps in a geographical region are abnormal, the server transmits a regional abnormal signal. Besides, other parts of the present embodiment are identical to the first embodiment, and the similarities are not repeated here.

For example, the base station 32 can be powered by the power module 21 for transmitting or sending a signal. Besides, when the message received by the server indicates that the situation is not one single street lamp being damaged but several street lamps being abnormal and the latitudes and longitudes show that these abnormal street lamps are very close to each other, it can be concluded that this situation may be caused because the cables are cut off in the entire geographical region. Therefore, the server transmits a regional abnormal signal to the telecom operator of the base station. Besides, the server can use a base station which is not affected by the tables which are cut off to transmit the regional abnormal signal to the telecom operators of the base station. Through the above method, each base station can be safely and effectively controlled.

Seventh Embodiment

Figure 11:
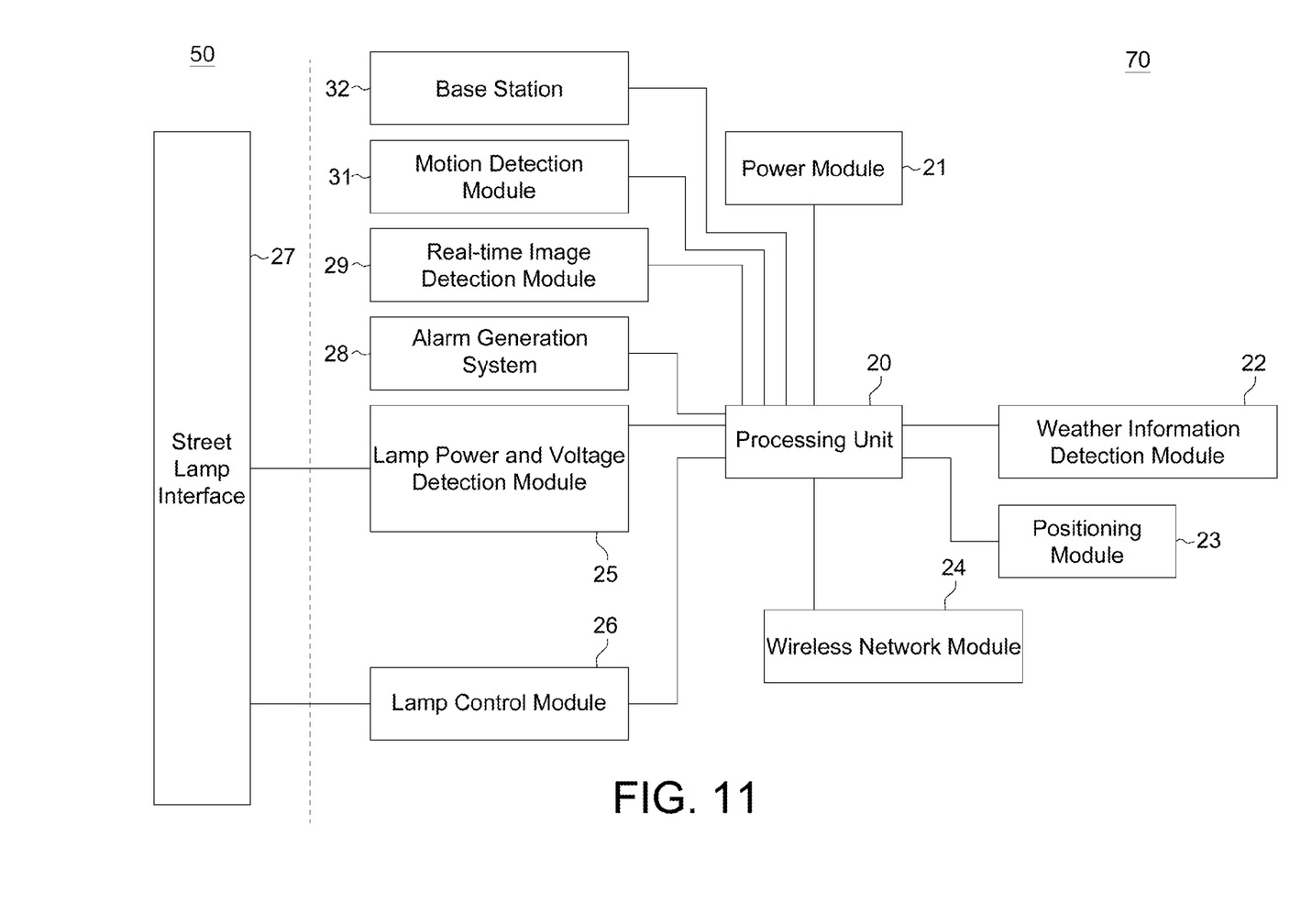
FIG. 11 shows a block diagram of an environment detection device 70 and a connection base 50 according to a seventh embodiment.

Referring to FIG. 11, a block diagram of an environment detection device 70 and a connection base 50 according to a seventh embodiment is shown. The environment detection device 70 of the present embodiment is different from the environment detection device 70 of the first embodiment mainly in that the environment detection device 70 of the present embodiment further comprises a base station 32, a motion detection module 31, a real-time image detection module 29, and an alarm generation system 28. Since relevant implementations of the present embodiment are already disclosed in the first to the fifth embodiment, the similarities are not repeated here.

The invention is exemplified by the first to the seventh embodiment. However, the first to the sixth embodiments can be concurrently or selectively implemented on the same street lamp 100. By using the wireless transmission technique, the invention can independently control the on/off state and brightness of individual illumination device 30, and the cables do not need to be rerouted for the purpose of reporting the status of street lamps. The invention further uses the environment detection device 70 to detect the weather information at the position of the street lamp. Apart from providing lighting function, the street lamp can further transmit the environment situation detected by the environment detection device 70 to the host or the server at a control center, such that the illumination device 30 can be dynamically controlled according to the provided information of environment situation.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An environment detection method suitable for a street lamp, wherein the environment detection method comprises:
providing latitude and longitude of the position of the street lamp;
detecting a weather information at the position of the street lamp;
generating a first network packet according to the weather information and the latitude and longitude; and
transmitting the first network packet to a server.

2. The environment detection method according to claim 1, wherein following the step of detecting the weather information at the position of the street lamp, the method further comprises:
determining whether an illumination device of the street lamp needs to be activated or shut down according to the latitude and longitude and the weather information;
activating the illumination device of the street lamp and determining whether the illumination device of the street lamp is abnormal if the illumination device of the street lamp needs to be activated, and reporting a failure message to the server and enabling the illumination device of the street lamp to enter a failure mode if the illumination device of the street lamp is abnormal; and shutting down the illumination device of the street lamp if the illumination device of the street lamp needs to be shut down.

3. The environment detection method according to claim 1, wherein following the step of generating the first network packet according to the weather information and the latitude and longitude, the method further comprises:

determining whether a current time has reached a pre-determined time;

transmitting the first network packet to the server if the current time has reached the pre-determined time.

4. The environment detection method according to claim 1, wherein following the step of generating the first network packet according to the weather information and the latitude and longitude, the method further comprises:

determining whether the environment detection device has received a control command from the server, and executing the operation corresponding to the control command if the environment detection device has received the control command from the server.

5. The environment detection method according to claim 1, further comprising:

receiving a fluid;

converting the flow of the fluid into a voltage to obtain a rainfall voltage value relevant to the fluid by an hourly rainfall sensor when the fluid flows through the hourly rainfall sensor.

6. The environment detection method according to claim 1, further comprising:

adjusting an illumination device of the street lamp according to the weather information detected by the environment detection device.

7. The environment detection method according to claim 1, wherein after receiving an alarm signal by the environment detection device, the environment detection device uses an alarm generation system to emit a warning light or a warning tone.

8. The environment detection method according to claim 7, further comprising:

generating a second network packet according to the alarm signal and the latitude and longitude; and transmitting the second network packet to the server.

9. The environment detection method according to claim 1, wherein the environment detection device detects an image frame by using a real-time image detection module, generates a second network packet according to the image frame, and further transmits the second network packet to the server.

10. The environment detection method according to claim 1, further comprising:

detecting an image frame by using a real-time image detection module;

detecting at least one moving object in the image frame by using a motion detection module;

determining whether the quantity of the at least one moving object in the image frame is greater than a quantity threshold of moving objects, and generating a determination result; and determining whether to adjust an illumination device of the street lamp according to the determination result.

11. The environment detection method according to claim 1, further comprising:

transmitting and/or receiving a signal by a base station disposed in the environment detection device.

12. The environment detection method according to claim 11, wherein the server transmits a regional abnormal signal when the server determines that all street lamps in a geographical region are abnormal.

13. An environment detection device coupled to an illumination device of a street lamp through a connection base for managing the illumination device of the street lamp;

the environment detection device comprises:

a positioning module for providing latitude and longitude of the position of the environment detection device;

a weather information detection module for detecting a weather information at the latitude and longitude;

a processing unit coupled to the positioning module and the weather information detection module for generating a first network packet according to the weather information and the latitude and longitude; and a wireless network module coupled to the processing unit for transmitting the first network packet to a server.

14. The environment detection device according to claim 13, further comprising:

a power module coupled to the processing unit for providing or receiving a power;

a lamp power and voltage detection module coupled to the connection base and the processing unit for detecting the output power and voltage of the illumination device of the street lamp; and a lamp control module coupled to the connection base and the processing unit for transmitting a control signal to the connection base.

15. The environment detection device according to claim 14, wherein the processing unit further determines whether the illumination device of the street lamp needs to be activated or shut down according to the latitude and longitude and the weather information;

if the illumination device of the street lamp needs to be activated, the processing unit controls the lamp control module to output a control signal of turning on power to the connection base to activate the illumination device of the street lamp, and the processing unit further determines whether the illumination device of the street lamp is abnormal, wherein if the illumination device of the street lamp is abnormal, the processing unit reports a failure message to the server and enables the illumination device of the street lamp to enter a failure mode; and if the illumination device of the street lamp needs to be shut down, the processing unit controls the lamp control module to output a control signal of turning off power to the connection base to shut down the illumination device of the street lamp.

16. The environment detection device according to claim 13, wherein the processing unit further determines whether a current time has reached a pre-determined time;

if the current time has reached the pre-determined time, the processing unit controls the wireless network module to transmit the first network packet to the server; and if the current time has not yet reached the pre-determined time, the processing unit does not transmit the first network packet to the server.

17. The environment detection device according to claim 13, wherein the processing unit determines whether the wireless network module has received a control command from the server;

if the wireless network module has received the control command from the server, the processing unit executes the control command.

18. The environment detection device according to claim 13, further comprising:
an hourly rainfall sensor for receiving a fluid, wherein when the fluid flows through the hourly rainfall sensor, the hourly rainfall sensor converts the flow of the fluid into a voltage to obtain a rainfall voltage value relevant to the fluid.

19. The environment detection device according to claim 14, wherein the processing unit controls the lamp control module according to the weather information, and the lamp control module transmits the control signal to the connection base, and the connection base adjusts the illumination device of the street lamp according to the control signal.

20. The environment detection device according to claim 13, further comprising:
an alarm device disposed on a lighting pole of the street lamp, wherein after the alarm device is triggered, the alarm device transmits an alarm signal to the processing unit, and the processing unit emits a warning light or a warning tone through an alarm generation system.

21. The environment detection device according to claim 20, wherein after the alarm device is triggered, the processing unit generates a second network packet according to the alarm signal and the latitude and longitude and transmits the second network packet to the server.

22. The environment detection device according to claim 13, further comprising:
a real-time image detection module coupled to the processing unit for detecting an image frame;
wherein the processing unit generates a second network packet according to the image frame, and further transmits the second network packet to the server.

23. The environment detection device according to claim 13, further comprising:
a real-time image detection module coupled to the processing unit for detecting an image frame; and
a motion detection module coupled to the processing unit for detecting at least one moving object in the image frame;
wherein the processing unit determines whether the quantity of the at least one moving object in the image frame is greater than a quantity threshold of moving objects and generates a determination result; wherein the processing unit further determines whether to adjust the illumination device of the street lamp according to the determination result.

24. The environment detection device according to claim 13, further comprising:
a base station disposed in the street lamp for transmitting and/or receiving a signal.

25. The environment detection device according to claim 24, wherein when the server determines that all street lamps in a geographical region are abnormal, the server transmits a regional abnormal signal.

\* \* \* \* \*